United States Patent Office 3,043,856
Patented July 10, 1962

---

3,043,856
REMOVAL OF GOSSYPOL FROM COTTON SEED PRODUCTS
Tiruvenkata Rajendra Seshadri and Kailash Chander, Delhi, India, assignors to Council of Scientific and Industrial Research, New Delhi, India, a corporation of India
No Drawing. Filed Dec. 11, 1958, Ser. No. 779,547
2 Claims. (Cl. 260—425)

This invention relates to the refining and the utilisation of cotton seed products.

The cotton seed products to which this invention relates include cotton seed oil, cotton seed meal, cotton seed flour and like cotton seed products, which are at present utilised for various purposes.

In the utilisation of the said products for various purposes, it is found that serious difficulties are encountered on account of the presence of gossypol and related compounds which are invariably present in these products.

For instance, cotton seed meal is an important food material for poultry, pig and other animals owing to its high content of proteins and other nutritional factors, and it has been advantageously used in a variety of baked products and confections. It is an important source for the recovery of proteins.

But owing to the toxic and growth inhibiting properties of gossypol and related pigments which are present in the seed its use has remained limited. Hens fed on cotton seed rations lay eggs which develop violet and red colourations on storage under ordinary conditions. This has also been attributed to the presence of gossypol in the cotton seed products.

Similarly, cotton seed oil which is an edible oil cannot be properly utilised owing to the presence of gossypol and related pigments.

Consequently, in the past various attempts have been made to reduce the "free gossypol" content of cotton seed meal by using higher cooking temperatures and the application of special extraction methods. But none of the methods hitherto proposed have been successful in completely removing gossypol and related pigments.

The present invention has for its object improvements whereby the difficulties such as those set forth above may be eliminated and it is based on the discovery that gossypol and like pigments which are responsible for the said difficulties can be conveniently removed from the said products in the form of their water-soluble borate-complexes (which, for brevity, will hereinafter be referred to as borate-complexes).

Based on this discovery, this invention, in its most general aspect, consists of a process of refining and utilising cotton seed products, which consists in mixing the said products with a borate solution, for converting the gossypol and like pigments present in the said products into borate-complexes, and separating the purified products from the said borate-complexes by any of the standard methods of separation, e.g., by centrifuging, decanting and filtering.

The borate solution above referred to may be an aqueous solution of borax, or a combination of borax and alkali, or sodium borate, or any other water soluble borate or a combination of boric acid and alkali.

The volume of the solution and the concentration to be used are capable of wide variation e.g. 1.0 g. to 15 g. of borax in 1 to 25% concentration per 1000 g. of cotton seed product. The mixture is usually stirred for about 20–30 minutes; the temperature can vary widely, for example between 20 and 75° C. The borate treated products could be washed with water (20–98° C.) to completely remove the borate-complexes and other impurities.

The treatment of the cotton seed product with the borate solution may be repeated, for improving the quality of the refined product.

In the case of cotton seed oil, which may contain a free acid, the neutralisation of the said free acid with alkali may be carried out either before the separation of the treated oil from the said borate-complexes or after the separation of the treated oil from the said borate-complexes.

If the said neutralisation is carried out after the separation of the borate-complexes from the refined oil, the soap stock produced will be of high quality.

The refined oil can be used for edible purposes, for hydrogenation, for soap making and for like purposes.

Gossypol can be recovered from the borate-complexes that are separated from the products refined by the aforesaid process. For this purpose, the clear aqueous solution of the said borate-complexes is covered with an organic solvent such as peroxide-free ether or chloroform, and acidified to liberate the free gossypol and like pigments which are taken up in the organic layer. A little sodium hydrosulphite is always added to the aqueous solution to prevent oxidation. The gossypol obtained as above is sufficiently pure and can be further purified by any of the standard methods.

This invention will now be more particularly described with reference to specific examples.

(The cotton seed product used in Examples 1, 2 and 3 was crude or raw cotton seed oil with about 3% free fatty acid content.)

EXAMPLE 1

Crude cotton seed oil (1000 g.) was stirred with an aqueous solution of borax (10 g. in 50 cc. water) for 20 minutes at 60° C. Sodium hydroxide (14 g. in 25 cc. of water) was then added to the above at 40° C. and stirred for 15 minutes. The oil thus treated was allowed to settle and the aqueous solution along with precipitated solids removed. The oil was then washed four times with hot water to remove impurities. The resultant oil was dried under vacuum and filtered. The ultra-violet spectrum of the refined oil obtained as above, showed the disappearance of the characteristic gossypol absorption band at $376\mu$. The refined oil sample when kept at 40° C. for one month did not shown any colour reversion.

EXAMPLE 2

*(Two Stage Process)*

Crude cotton seed oil (100 lb.) was stirred with an aqueous solution (1 lb. borax in 5 lb. water) for 25 minutes at 60° C. After allowing the contents to settle, the borate-complexes and other impurities were removed from the bottom of the refining kettle. The oil was given a wash with hot water to completely remove the remaining water soluble borate-complexes and other impurities. Aqueous caustic soda (0.75 lb., 16%) was then added at 55–60° C. and stirred for 15 minutes. The oil was allowed to settle and the soap stock removed. It was washed with hot water to remove alkali and the remaining impurities. The oil obtained was dried under vacuum and filtered. Ultraviolet absorption measurement of a sample of this oil showed absence of gossypol, and it did not show any colour reversion when kept at 40° C. for one month.

EXAMPLE 3

Crude cotton seed oil (100 lb.) was stirred with an aqueous solution (6.6 lb.) containing 0.53 lb. borax and 0.13 lb. sodium hydroxide for 20 minutes at 58° C. After allowing the contents to settle, the borate-complexes and other impurities were removed. The oil was given a wash so as to remove the remaining impurities. Aqueous caustic soda (0.75 lb., 16%) was then added and stirred for 15 minutes at 55–60° C. The oil was allowed to settle and the soap stock removed. It was washed with hot water, dried and filtered. Ultra-violet absorption measurements indicated the absence of gossypol and related pigments.

(The cotton seed product used in Examples 4 and 5 were cotton seed meal and cotton seed flour respectively.)

EXAMPLE 4

The cotton seed meal was obtained by a thorough grinding of cotton seed cake from which oil had been removed by an expeller. 500 g. of the said meal was mixed with 1.5 litres of an aqueous solution of 0.5% borax. The mixture was vigorously stirred for about 30 minutes and then centrifuged. The residue was then thoroughly washed. The meal thus obtained was dried under vacuum. A chloroform extract of the meal indicated the absence of gossypol and related pigments.

EXAMPLE 5

500 g. of cotton seed flour was mixed with 1.5 litres of an aqueous solution of 0.5% of borax. This was vigorously stirred for about 30 minutes and then centrifuged. The residue was then thoroughly washed. The flour thus obtained was dried under vacuum.

What we claim is:

1. A process for purifying cotton seed oil by removal of gossypol therefrom which consists of
   mixing said cotton seed oil with a borate solution selected from the group consisting of an aqueous solution of borax and an aqueous solution of borax and sodium hydroxide
   the borax in each solution being in the proportion of about 0.5 to 1.5 parts by weight per 100 parts of said cotton seed oil for converting said gossypol present in said cotton seed oil under non-acid conditions into their water-soluble borate complexes,
   stirring the mixture at a temperature between 20 and 75° C., and washing the mixture with water between 20 and 98° C. to completely remove the borate complexes from the cotton seed oil.

2. A process for purifying cotton seed products selected from the group consisting of cotton seed meal and cotton seed flour by removal of gossypol therefrom which consists of
   mixing said cotton seed products with a borate solution selected from the group consisting of an aqueous solution of borax and an aqueous solution of borax and sodium hydroxide,
   the borax in each solution being in the proportion of about 0.5 to 1.5 parts by weight per 100 parts of said cotton seed products for converting said gossypol present in said cotton seed products under non-acid conditions into their water-soluble borate complexes,
   stirring the mixture at a temperature between 20 and 75° C.,
   and washing the mixture with water between 20 and 98° C. to completely remove the borate complexes from the cotton seed products.

References Cited in the file of this patent

UNITED STATES PATENTS

| | | |
|---|---|---|
| 749,925 | Fleming | Jan. 19, 1904 |
| 1,671,834 | McNicoll | May 29, 1928 |
| 1,937,320 | Franzen et al. | Nov. 28, 1933 |
| 1,981,605 | Schellmann | Nov. 20, 1934 |
| 2,249,701 | Clayton | July 15, 1941 |
| 2,644,004 | Dron et al. | June 30, 1953 |
| 2,746,864 | Pack et al. | May 22, 1956 |
| 2,752,378 | Julian et al. | June 26, 1956 |
| 2,803,636 | Williams | Aug. 20, 1957 |

FOREIGN PATENTS

| | | |
|---|---|---|
| 481,580 | Great Britain | 1938 |